Aug. 15, 1961     C. B. ASKE, JR     2,996,335
WHEEL AND TIRE TRIM CONSTRUCTION
Filed Dec. 19, 1960     2 Sheets-Sheet 1
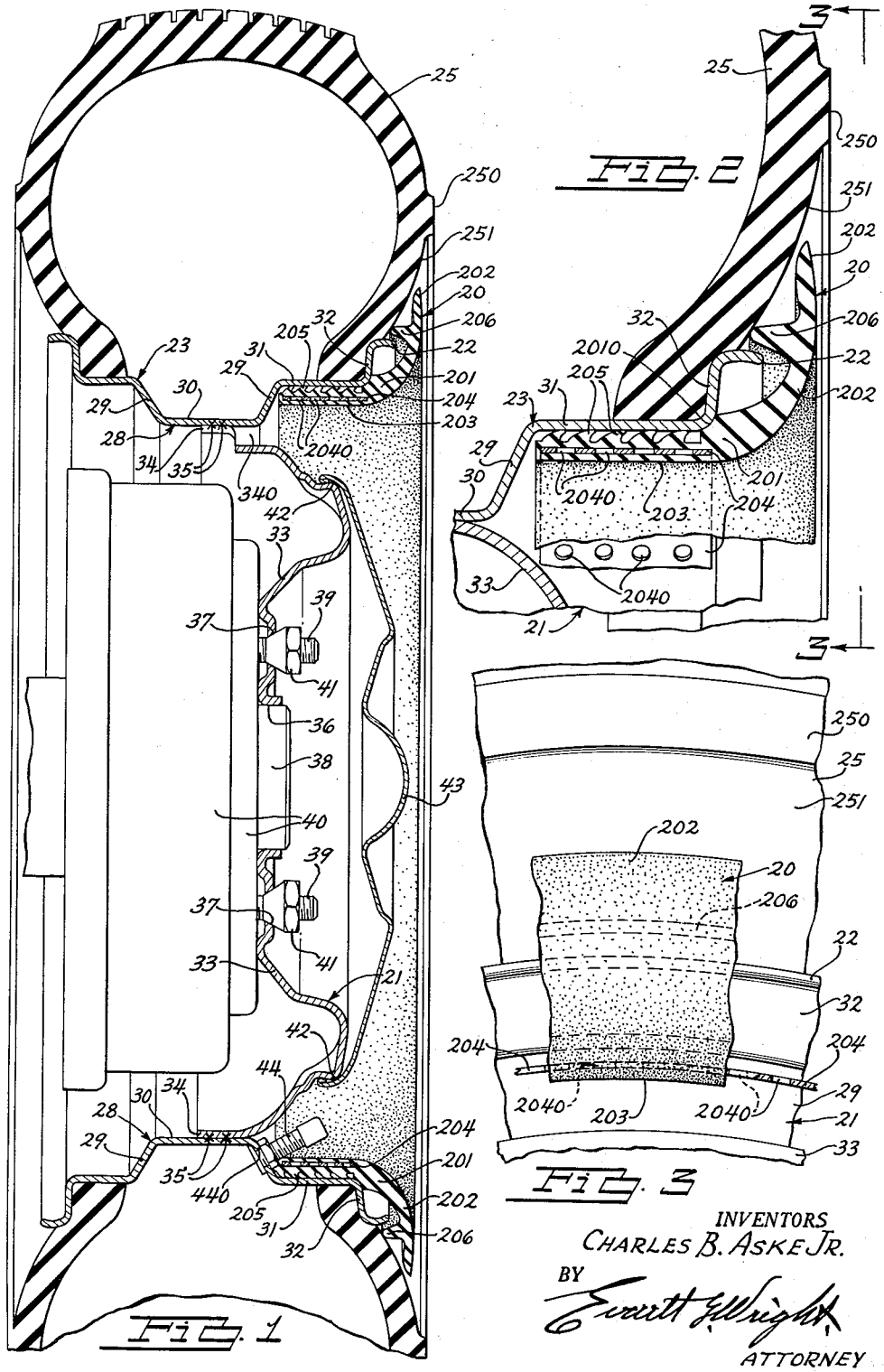
INVENTORS
CHARLES B. ASKE JR.
BY
ATTORNEY

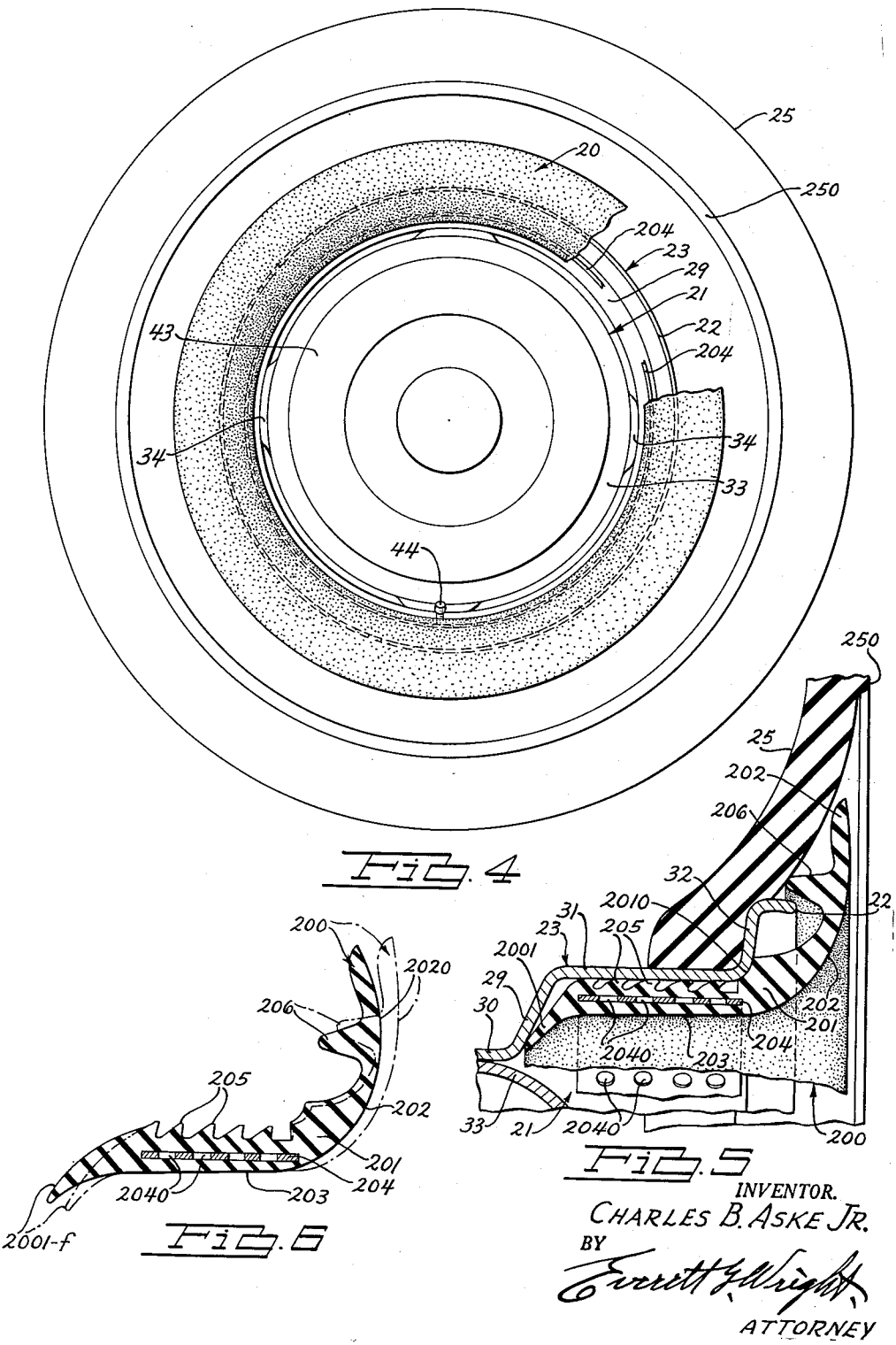

United States Patent Office 2,996,335
Patented Aug. 15, 1961

2,996,335
WHEEL AND TIRE TRIM CONSTRUCTION
Charles B. Aske, Jr., Birmingham, Mich., assignor, by direct and mesne assignments, to Gar Wood Industries, Inc., a corporation of Michigan
Filed Dec. 19, 1960, Ser. No. 76,722
4 Claims. (Cl. 301—37)

This invention relates to an improved and simplified wheel rim and tire trim construction and has for the primary object thereof the providing of a massive white or other color wheel rim and tire trim of one piece construction requiring only the telescoping of a unitary element onto the vehicle wheel rim within the tire bead seat flange thereof to accomplish the desired ornamental effect.

Other objects of the invention will become obvious by reference to the following detailed description taken in connection with the accompanying drawings, in which:

FIG. 1 is a vertical sectional view through a vehicle wheel and tire equipped with a wheel and tire trim embodying the invention showing its relationship to a modern vehicle wheel having a hub cap and tire thereon.

FIG. 2 is an enlarged fragmentary detailed sectional view of the rim and tire trim disclosed in FIG. 1.

FIG. 3 is a fragmentary elevational view taken on the line 3—3 of FIG. 2.

FIG. 4 is a side elevational view of a vehicle wheel and tire equipped with the wheel and tire trim embodying the invention disclosed in FIGS. 1–3 inclusive FIG. 5 is an enlarged fragmentary detailed sectional view similar to FIG. 2 but showing a modified form of the invention.

FIG. 6 is a sectional view of the tire and rim trim disclosed in FIG. 5 showing in full lines the form in which the tire and rim trim is molded, and in dot and dash lines the form assumed thereby when mounted on a vehicle wheel.

Referring now to the drawings wherein like reference numerals refer to like and corresponding parts throughout the several views, the embodiment of the invention disclosed in FIGS. 1–4 inclusive consists of an improved unitary highly effective vehicle wheel and tire trim element 20 which is disclosed in connection with a typical modern vehicle wheel 21 having a tubeless tire 25 mounted thereon.

The said vehicle wheel 21 has a drop center rim 23 composed of a central channel or drop center 28 having side walls 29 and a base 30. An annular tire bead seat 31 extends laterally outwardly from each side of the side walls 29 of the drop center 28, each said tire bead seats 31 terminating in a tire bead seat flange 32 extending upwardly therefrom which is curved at its upper portion to form an axially disposed outer lip 22. The said tire bead seat flange 32 is ofttimes referred to as the wheel flange and the said lip 22 is ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is generally formed with an annular axially outwardly extending collar 330 which is preferably provided with a plurality of hub cap retainer nubs 42 over which a conventional hub cap 43 is sprung for securement onto the vehicle wheel 21. The said spider collar 330 has an annular exposed painted surface 331 extending from the outer periphery of the hub cap 43 to the drop center wheel rim 23, which also has its exposed surfaces painted. The particular tire 25 illustrated in the drawings is a modern tubeless tire having a scuff bead 250 extending from its wall 251. The said tubeless tire 25, when used on the vehicle wheel 21, requires a valve stem 44 to be mounted in sealed relationship through a valve stem aperture 440 provided in the outer wall 29 of the drop center rim channel 28 of the rim 23 of the said wheel 21.

The improved vehicle wheel and tire trim 20 is preferably of molded live rubber, synthetic rubber or other resilient moldable material, and includes an annular gage portion 201, an annular curved side wall portion 202 extending radially outwardly from said gage portion 201, and an annular anchorage flange portion 203 extending axially inwardly from the said gage portion 201. The said anchorage flange portion 203 has molded therein an annular metal reinforcing band 204 preferably perforated therearound at 2040 with the perforations preferably circular and staggered in respect to each other. This embedded reinforcement 204 is sufficiently heavy to maintain the annular form of the wheel and tire trim element 20 and to maintain its shape when pressed or hammered in place within the axially outer annular tire bead seat 31 of the vehicle wheel 21.

The said gage portion 201 is that portion of the vehicle wheel and tire trim 20 which is located at the juncture of the annular curved side wall portion 202 and the annular anchorage flange portion 203 thereof, and the said gage portion 201 has a suitably shaped abutment at 2010 to abut the juncture of the axially outer annular face of the tire bead seat 31 and the radially inner portion of the tire bead seat flange 32. The annular reinforcement 204 of the anchorage flange portion 203 of the vehicle wheel and tire trim element 20 preferably extends axially outwardly at least as far as the gage portion 201 thereof, and, although not shown, it may extend a short distance axially outwardly into the said gage portion 201 provided that the axial outer edge of the reinforcement element 204 is located somewhat axially inwardly of the outer edge of the lip 22 of the wheel rim 23.

The annular anchorage flange portion 203 of the wheel and tire trim element 20 is provided with a plurality of circumferential axially spaced anchorage teeth 205 disposed radially outwardly therefrom. These annular anchorage teeth 205 are preferably so formed as to flex at their apices axially outwardly as best shown in FIG. 2 when the annular anchorage flange portion 203 of the wheel and tire trim element 20 is manually pressed axially onto a vehicle wheel 21 within the tire bead seat 31 thereof. It can be readily observed that, to remove the wheel and tire trim element 20 from the vehicle wheel 21, the apices of the annular teeth 205 of the anchorage flange portion 203 thereof necessarily will flex or roll over and become axially inwardly disposed upon the initial axial outward movement of the wheel and tire trim element 20 when pried off the vehicle wheel 21 with a tire iron or large screw driver. The annular reinforcement 204 not only maintains the wheel and tire trim element 20 annular in shape but serves as a pressure ring to hold the annular anchorage flange portion 203 thereof to the proper diameter so that the circumferential axially spaced anchorage teeth 205 of the anchorage flange portion of the said wheel and tire trim element 20 will function perfectly as means for anchoring the wheel and tire trim element 20 on the vehicle wheel 21. Although the particular vehicle wheel 21 has a relatively wide outer tire bead seat 31, the instant invention is applicable to vehicle wheels having very narrow outer tire bead seats which accommodate only three anchorage teeth 205 rather than the five illustrated in the drawings.

The axially inward face of the annular curved side wall portion 202 of the wheel and tire trim element 20 may be provided with a gage rib 206 disposed to contact the wall 251 of the tire 25 just above the lip 22 of the rim of the vehicle wheel 21 so as to hold the outer peripheral edge of the curved side wall portion 202 of the wheel and tire trim element 20 slightly spaced from the tire wall 251, thus preventing discoloration of the relatively thin outer periphery of curved side wall portion 202 of the wheel and tire trim element 20 in the event it is made of white or a light color natural rubber. However, this gage rib may be eliminated, and it forms no part of the instant invention inasmuch as discoloration by bleed through of carbon black from the black wall 251 of a normal black wall tire can be prevented in another manner, or, a synthetic rubber-like material resistant to such bleed through may be employed in wheel and tire trim elements of the invention.

Referring now to FIGS. 5 and 6, the wheel and tire trim element 200 disclosed therein is like and similar to the wheel and tire trim element 20 shown in FIGS. 1–4 inclusive except that a flexible skirt 2001 has been added to the inner periphery of the anchorage flange portion 203 thereof. This skirt 2001 is preferably tapered to a thin inner periphery and provides a neat abutment of the inner annulus of the anchorage flange portion 203 of the wheel and tire trim element with the axially outer side wall 29 of the drop center 28 of the vehicle wheel trim 23. With such construction the visual size of the wheel and tire trim is increased, and the lodgement of dirt behind the anchorage flange portion 203 is eliminated.

In FIG. 6, the full lines show the shape of the wheel and tire trim element 200 as molded, while the dot and dash lines at 2001-*f* show the extent to which the skirt 2001 is flexed when the wheel and tire trim element 200 is mounted on a vehicle wheel 21 as shown in FIG. 5. This flexing of the skirt 2001 when mounted on a vehicle wheel 21 provides an adequately tight seal against the axially outer side wall 29 of the drop center 28 of the vehicle wheel 21 to prevent dirt from accumulating at the inner axial annulus of the the anchorage flange portion 203 of the wheel and tire trim element 200. Also is shown in FIG. 6 in dot and dash lines 2020 the extent to which the annular curved side wall portion 202 is flexed from its molded shape when mounted on a vehicle wheel 21 as shown in FIG. 5.

By using white or other colors for the wheel and tire trim elements 20 and 200, a special wheel and tire trim effect is provided giving a heavy tire eye appeal so essential in compact cars using small wheels and correspondingly small tires. The improved unitary wheel and tire trim construction is easily and readily applied to a vehicle wheel and may be removed without damage thereto, yet the removal is sufficiently difficult that theft of the wheel and tire trim elements is not readily accomplished.

Also, by using known molding techniques, the annular curved side wall portion 202 and the annular anchorage flange portion 203 of either of the wheel and tire trim elements 20 or 200 may be made of different colors, thus providing a two toned wheel and tire trim construction. In which event, the skirt 2001 of the anchorage flange portion 203 of the wheel and tire trim element 200 would be the same color as the anchorage flange portion 203 thereof, while the annular curved side wall portion 202 would be of a contrasting color such as white.

Although but a single embodiment of the invention and one modification thereof have been disclosed and described in detail, it is obvious that many changes may be made in the size, shape, arrangement and detail of the various elements thereof, all without departing from the spirit and scope of the invention as defined by the appended claims.

I claim:

1. In a unitary wheel and tire trim construction for vehicle wheels including a wheel rim having a drop center portion, tire bead seats and tire bead flanges, and a tire mounted thereon, the outer tire bead seat forming an axially disposed annulus and the outer tire bead flange forming a radially disposed flange terminating in an axially disposed rim lip, said wheel and tire trim construction comprising an integrally molded resilient annular wheel and tire trim member including a gage portion formed to abut against the juncture of the tire bead seat and the tire bead seat flange, an annular curved side wall portion extending radially outwardly from said gage portion overlying the lip of the wheel rim and the axially outer wall of the tire mounted on said wheel rim and formed to flex toward said tire wall, and an anchorage flange portion extending axially inwardly from said gage portion within said tire bead seat annulus, said anchorage flange portion including at its outer periphery a plurality of circumferential axially spaced resilient teeth formed to flex axially outwardly into firm but removable engagement with said tire bead seat annulus when said anchorage flange portion is telescoped therewithin, and an annular metal reinforcing band generally co-extensive of the teeth of the anchorage flange portion molded therewithin sizing the same and providing structural strength to the said wheel and tire trim member to admit of the ready mounting thereof on said vehicle wheel.

2. A unitary wheel and tire trim construction for vehicle wheels as claimed in claim 1 wherein the anchorage flange portion of the wheel and tire trim member includes an annular skirt at the axially inner periphery thereof formed to flex against the drop center portion of said wheel rim when the integrally molded wheel and tire trim element is mounted on a vehicle wheel.

3. In a unitary wheel and tire trim construction for vehicle wheels including a wheel rim having a drop center portion, tire bead seats and tire bead flanges and a tire mounted thereon, the outer tire bead seat forming an axially disposed annulus and the outer tire bead flange forming a radially disposed flange terminating in an axially disposed rim lip, said wheel and tire trim construction comprising an integrally molded resilient annular wheel and tire trim member including a gage portion formed to abut against the juncture of the tire bead seat and the tire bead seat flange, an annular curved side wall portion extending radially outwardly from said anchorage portion overlying the lip of the wheel rim and the axially outer wall of the tire mounted on said wheel rim and formed to flex against the said tire wall, and an anchorage flange portion extending axially inwardly from said gage portion within said tire bead seat annulus, said anchorage flange portion including at its outer periphery a plurality of circumferential axially spaced resilient teeth formed to flex axially outwardly into firm but removable engagement with said tire bead seat annulus when said anchorage flange portion is telescoped therewithin, and a perforated annular metal reinforcing band generally co-extensive of the teeth of the anchorage flange portion molded therewithin sizing the same and providing structural strength to the said wheel and tire trim member to admit of firm mounting thereof on said vehicle wheel.

4. A unitary wheel and tire trim construction for vehicle wheels as claimed in claim 3 wherein the anchorage flange portion of the wheel and tire trim member includes an annular skirt at the axially inner periphery thereof formed tapering to a thin inner peripheral edge to flex against and conform to the drop center portion of said wheel rim when the integrally molded wheel and tire trim element is mounted on a vehicle wheel.

References Cited in the file of this patent

UNITED STATES PATENTS

| | | |
|---|---|---|
| 2,271,432 | Hull et al. | Jan. 27, 1942 |
| 2,736,610 | Waite | Feb. 28, 1956 |
| 2,963,325 | Aske et al. | Dec. 6, 1960 |
| 2,970,012 | Lyon | Jan. 31, 1961 |

FOREIGN PATENTS

| | | |
|---|---|---|
| 1,061,278 | France | Nov. 25, 1953 |